July 2, 1929.　　　J. S. GULLBORG　　　1,719,763
HAND TRUCK
Filed March 14, 1927　　2 Sheets-Sheet 1
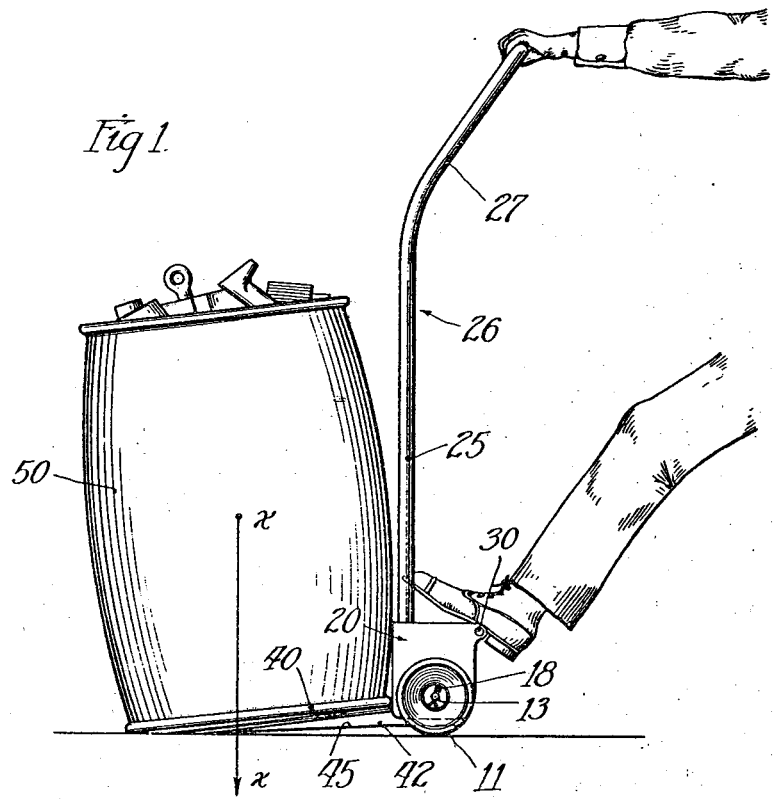
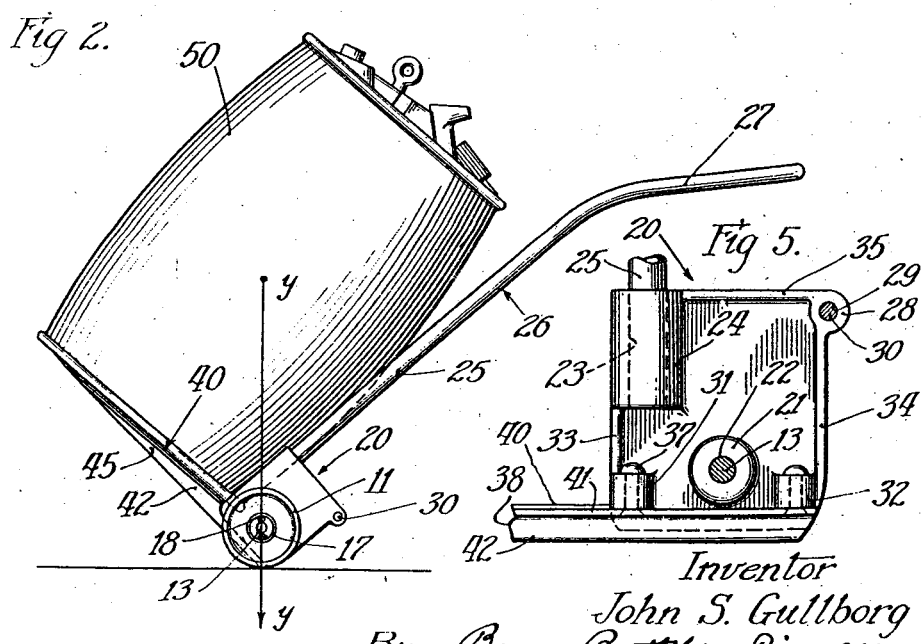
Inventor
John S. Gullborg
By Brown, Boettcher & Dienner
Attys.

July 2, 1929.  J. S. GULLBORG  1,719,763
HAND TRUCK
Filed March 14, 1927   2 Sheets-Sheet 2
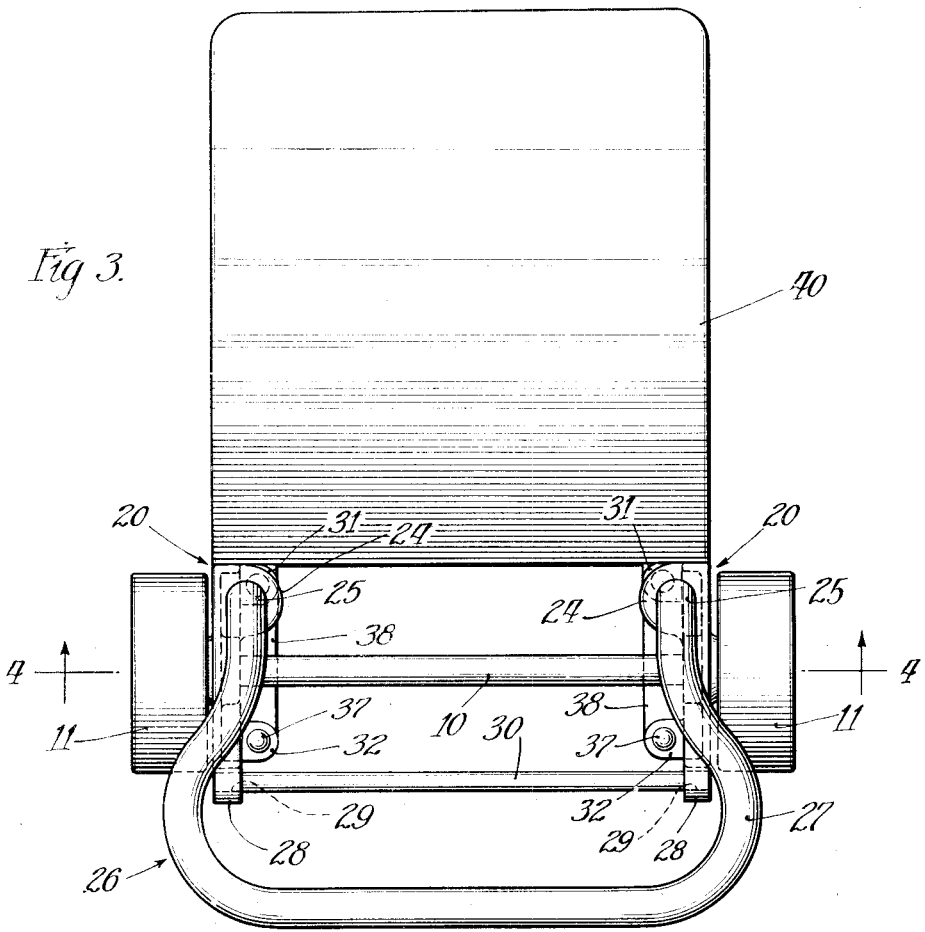
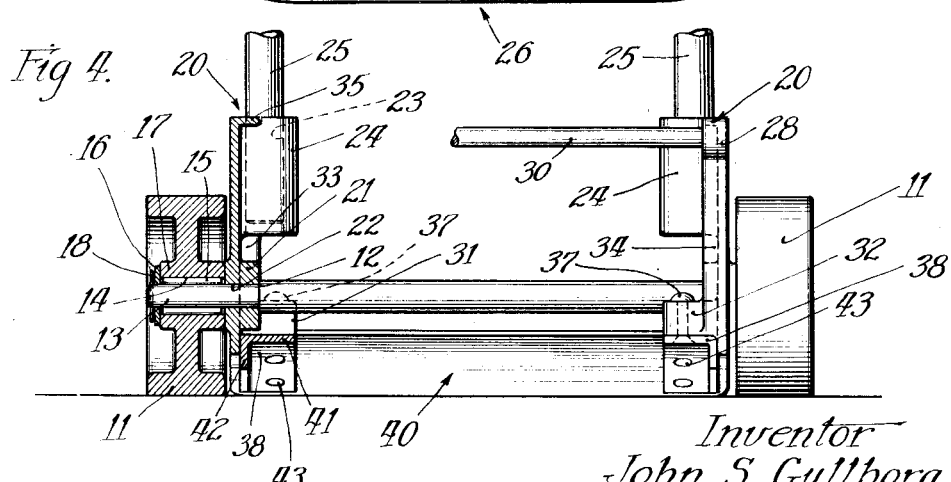
Inventor
John S. Gullborg
By Brown, Boettcher & Diener
Attys.

Patented July 2, 1929.

1,719,763

UNITED STATES PATENT OFFICE.

JOHN S. GULLBORG, OF CHICAGO, ILLINOIS, ASSIGNOR TO ALEMITE DIE-CASTING & MFG. CO., OF CHICAGO, ILLINOIS, A CORPORATION OF ILLINOIS.

HAND TRUCK.

Application filed March 14, 1927. Serial No. 175,033.

My present invention relates to manually propelled vehicles and more particularly to hand trucks of the same general character as that disclosed in my co-pending application, Serial No. 75,919 filed December 17, 1925.

I propose to provide a greatly simplified truck having a flat slanting platform adapted to be shoveled with facility under the load to be conveyed without the necessity of initially tilting the load to enable the platform to be moved thereunder.

I purposely make the flat platform relatively long so that when it is under the load it at least extends past the center of gravity of the load thus enabling the trucker to readily tilt the load by exerting a downward pressure on the handle of the truck. By using a flat topped platform which is clear of side plates or connections on its top surface, it is possible to push the platform under an object of greater diameter than the width of the platform.

In accordance with other features of my invention I provide a hand truck wherein the handle is normally disposed in a substantially vertical plane. The upper end is preferably bent slightly out of the vertical and toward the trucker so as to enable him to exert a downward pressure thereon with a minimum of effort.

The handle of my truck is disposed at such an angle to the platform that when the load is tilted it not only can partially rest against the legs of the handle but its center of gravity is disposed in vertical alignment with the axis of the wheels.

In order to enable a rigid connection between the platform and the U-shaped handle I provide a pair of novel bracket members mounted on the axle between the wheels. These bracket members are connected by a foot rod which is disposed at the rear of the handle where it is readily accessible to the trucker.

It is possible with my truck to shovel the platform right underneath heavy loads weighing up to five hundred pounds with a minimum of effort on the part of only one man. It is so designed that one man lifts the load simply by tipping back the truck. Furthermore, due to the fact that the center of gravity is directly over the wheels when the truck is tipped, the load is always on the truck when it is being moved and never on the man.

Other objects and advantages of my invention will more fully appear from the following detailed description taken in connection with the accompanying drawings which illustrate one embodiment thereof and in which:

Figure 1 is a side view of my truck with a load thereon illustrating the center of gravity of the load prior to the tilting of the truck;

Fig. 2 is a view similar to Fig. 1 but differing therefrom in that the truck is shown in its tilted position with the center of gravity of the load immediately over the axis of the truck wheels;

Fig. 3 is an enlarged plan view of my truck;

Fig. 4 is a fragmentary view partly in section and partly in elevation taken on substantially the line 4—4 of Fig. 3; and Fig. 5 is an enlarged detailed view illustrating the construction of my bracket member.

Referring now to the drawings in detail in which like reference numerals designate similar parts throughout the several views, 10 denotes generally an axle having disposed on its free ends a pair of spaced rollers or wheels 11—11 (Fig. 4). Each end of the shaft or axle 10 is provided with a shoulder 12 and a reduced end 13 upon which the roller 11 is mounted.

Each roller 11 is provided with a central opening 14 in which is disposed a roller bearing unit 15 positioned upon the reduced end 13 of the shaft 10. The extreme end of the reduced portion 13 has mounted thereon a washer 16 which abuts the associated hub 17 of the wheel 11 and which is held in place by a cotter pin 18 extending through a suitable opening in the portion 13. This cotter pin holds the wheel 11 in place on the end of the shaft 10.

Positioned on the shaft 10 between the two wheels 11 are a pair of bracket members 20—20. Since the bracket members are identical in construction it is believed that a description of one will suffice for both. By "identical" I mean that they are substantially alike in form. They are merely left and right hand patterns. One of the bracket members is illustrated on an enlarged scale in Figure 5.

Each of the members 20 has a hub portion 21 provided with an opening 22 through which extends the reduced end 13 of the shaft 10. On one side the bracket abuts the wheel 11 whereas on the other side the hub 21 abuts the shoulder 12 on the shaft 10, (Fig. 4). Each of the members 20 is preferably of a polygonal shape and is preferably made of semi-steel. The wheels 11 are also preferably made of semi-steel. When the truck is in its untilted position the bracket members 20 will be disposed substantially vertically with respect to the floor as is clearly shown in Fig. 1.

Each bracket member 20 has formed thereon an apertured lug 24 for receiving one end of a leg 25 of the U-shaped handle 26. It will be observed from Fig. 5 that the lug 24 is disposed in a substantially vertical position in one of the upper front corners of the bracket 20 above and an appreciable distance in advance of the axle 10. It has an opening or aperture 23 for receiving the free end of the associated leg 25. The end of the leg 25 may be anchored to the lug 24 by any suitable means. It will be observed in Figure 1 that the parallel legs 25 of the U-shaped handle 26 are disposed in substantially a vertical plane. The upper end of the handle 26 is bent out of the vertical as shown at 27 in a direction toward the operator of the vehicle.

The U-shaped handle 26 is relatively long and is adapted to apply relatively great leverage to the members 20 for the purpose of pivoting them about the axis of the axle 10 all of which will become more apparent from the description to hereinafter follow. I find that, by providing the upper end of the handle 26 with the bend 27, the operator is enabled to pull downwardly on the handle with greater facility than when a perfectly straight handle is employed.

The other upper corner of each of the members 20 is provided with a boss 28 provided with an opening 29 in which is anchored one end of a foot rod 30 disposed above and an appreciable distance in rear of the axle 10. The rod 30 is adapted to be engaged by the foot of the operator as shown in Fig. 1 for the purpose of aiding the operator in the tilting of the truck. This rod incidentally also serves to space and reinforce the two members 20.

The lowermost portion of the bracket member 20 is provided with a pair of spaced vertical lugs 31 and 32. The lug 31 is connected to the lug 24 by means of a reinforcing rib 33. Similarly the lug 32 is connected to the boss 28 by means of a rib 34. The top of the member 20 is provided with a reinforcing rib 35 positioned between the lug 24 and the boss 28. These three ribs 33, 34 and 35 tend to greatly reinforce and strengthen the construction of the member 20. Referring to Figs. 3 and 4, I shall now proceed to describe the loading platform and the connection between the platform and the member 20.

Fastened to the lugs 31 and 32 of each member 20 by means of rivets or bolts 37 is an angular member 38 which preferably comprises a strip of angle iron. It is, of course, to be understood that one of these members 38 is associated with each of the members 20. The two right angle members 38 are disposed in parallel relationship and are adapted to have fastened thereto a supporting platform 40. This platform is preferably made of heavy steel plate and may be riveted to the upper legs of the members 38. The vertical leg of each of the members 38 is designated by the reference character 42 and the horizontal leg is designated by the reference character 41. As previously pointed out the horizontal leg 41 is riveted to the lugs 31 and 32 by the rivets 37 and is suitably anchored to the platform 40 by means of rivets 43. The vertical legs of the angular members 38 each has a tapered edge 45 (Figs. 1 and 2) which edge performs the function of wedging the platform 40 under a load to be lifted and conveyed. This feature will be described in detail hereinafter.

Referring to Figure 1 it will be observed that the platform 40 slants downwardly from the members 20 and is disposed at a relatively slight angle to the plane of the floor or other support. Furthermore, the platform 40 is flat topped and is connected on only its underside to the members 20. Its top surface is entirely clear of any connections or side plates thus enabling an object having a larger diameter than the width of the platform to be moved onto the platform. In the operation of the device, as will be more fully explained hereinafter, the platform 40 is adapted to be shoveled under a load, such for example as the barrel of castings indicated by the reference character 50 in Figs. 1 and 2. The line X—X in Fig. 1 illustrates the center of gravity of the barrel of castings 50 when the truck is disposed in a normal position. The free end of the platform 40 is adapted to extend past this center of gravity as shown in Fig. 1. On the other hand, when the truck is tilted the center of gravity of the load will be disposed in a plane cutting the axis of the axle 10. I have illustrated the center of gravity in Fig. 2 by the line Y—Y.

The operation of my truck is briefly as follows:—Normally the truck is disposed in the position shown in Fig. 1 wherein the handle is located substantially perpendicular to the floor and the slanting platform has its free end touching the floor. Assuming the load to be transfered is a barrel of castings 50 the operator approaches the load with the platform engaging the floor and shovels or forces the platform under the barrel as shown in Fig. 1. It is not necessary with the applicant's truck to initially tilt the barrel or other loads in order to get the platform thereunder. Furthermore, the platform is of such a length that when the load or barrel 50 is disposed thereon, its center of gravity as shown on the line X—X in Fig. 1 passes through the platform 40.

Thereafter the operator places one foot upon the rod 30 and steadies the truck while he exerts a downward pressure upon the handle 25 at the bent portion 27. Also, by exerting a downward pressure upon the foot rod 30 the operator can use his leg to advantage in tilting the truck. The load on the truck is tilted to the balanced position as shown in Fig. 2. When the load is in this position it will be observed that the center of gravity represented by the line Y—Y in Fig. 2 extends through the axis of the shaft or axle 10. This means that the entire weight of the load will be on the wheels 11 and not on the trucker. Furthermore, the load which may be a barrel 50 is adapted to engage the legs 25 of the handle 26 which cooperates with the platform 40 in properly suporting the load as shown in Fig. 2. Thereafter the load can be moved with facility from place to place by the trucker.

When the trucker has conveyed the load to the desired location which may be some hard-to-get-at spot, the truck is moved back to the position shown in Fig. 1. Then the operator or trucker merely draws the platform 40 from under the load.

The applicant's truck is not only highly simple, but it shovels under heavy loads weighing as much as five hundred pounds. No time is lost in first raising the merchandise off the floor. Moreover, with this truck one trucker can perform both the loading and the unloading operations. Then, too the leverage supplied by the handle 26 is relatively great so that the trucker lifts the load simply by tipping back the truck.

Now I desire it understood that although I have illustrated and described the preferred embodiment of my invention, the invention is not to be thus limited but, only in so far as defined by the scope and spirit of the appended claims.

I claim:—

1. In a vehicle of the class described, an axle, a pair of wheels mounted thereon, a pair of spaced bracket members mounted on the axle between the wheels, a rod connecting the said bracket members and constituting a foot rod, a handle connected to said members, and a relatively flat topped platform mounted on said bracket members.

2. In a truck of the character described, a wheel mounted platform structure, an upwardly extending handle construction secured to the platform structure in advance of the wheel axis thereof, and a foot rod connecting the lateral portions of the platform structure in rear of the wheel axis.

3. In a truck of the character described, a wheel mounted platform structure, an upwardly extending handle construction secured to the platform structure above and in advance of the wheel axis thereof, and a foot rod connecting the lateral portions of the platform structure and disposed above and in rear of the wheel axis.

4. In a truck of the character described, a wheel mounted axle, substantially rectangular brackets mounted at their lower central portions on the axle, a platform structure secured to the brackets at the lower portions thereof, a handle construction secured to the upper forward corner portions of the brackets, and a crossbar connecting the upper rearward corner portions of the brackets.

5. In a hand truck, an axle, a pair of wheels mounted thereon, a pair of spaced bracket members mounted on the axle, a rod connecting said bracket members and constituting a foot rod, lugs on the upper forward portion of said brackets and having vertically disposed openings therein, a handle having its end extending into said openings, and a relatively flat topped platform secured to the lower portion of said bracket members.

6. In a hand truck, an axle, a pair of wheels mounted thereon, a pair of spaced bracket members mounted on said axle, lugs on the upper rearward corners of said brackets, a foot rod connecting said lugs, lugs on the upper forward portions of said brackets and having vertically disposed openings therein, a handle extending into said openings, lugs on the lower portion of said brackets having angle members secured thereto, and a relatively flat topped platform secured to said angle members.

7. In a hand truck, a pair of wheel supported bracket members, a platform mounted on the bracket members below the axis of the wheels, a handle construction secured to both bracket members in advance of the axis of the wheels, and a foot rod connecting the bracket members at the rear of the axis of the wheels.

In witness whereof, I hereunto subscribe my name this 10th day of March, 1927.

JOHN S. GULLBORG.